March 10, 1942.                K. E. WHITNEY                2,275,708
                    HUMIDITY RESPONSIVE CONTROL DEVICE
                        Filed Dec. 3, 1937          3 Sheets-Sheet 1
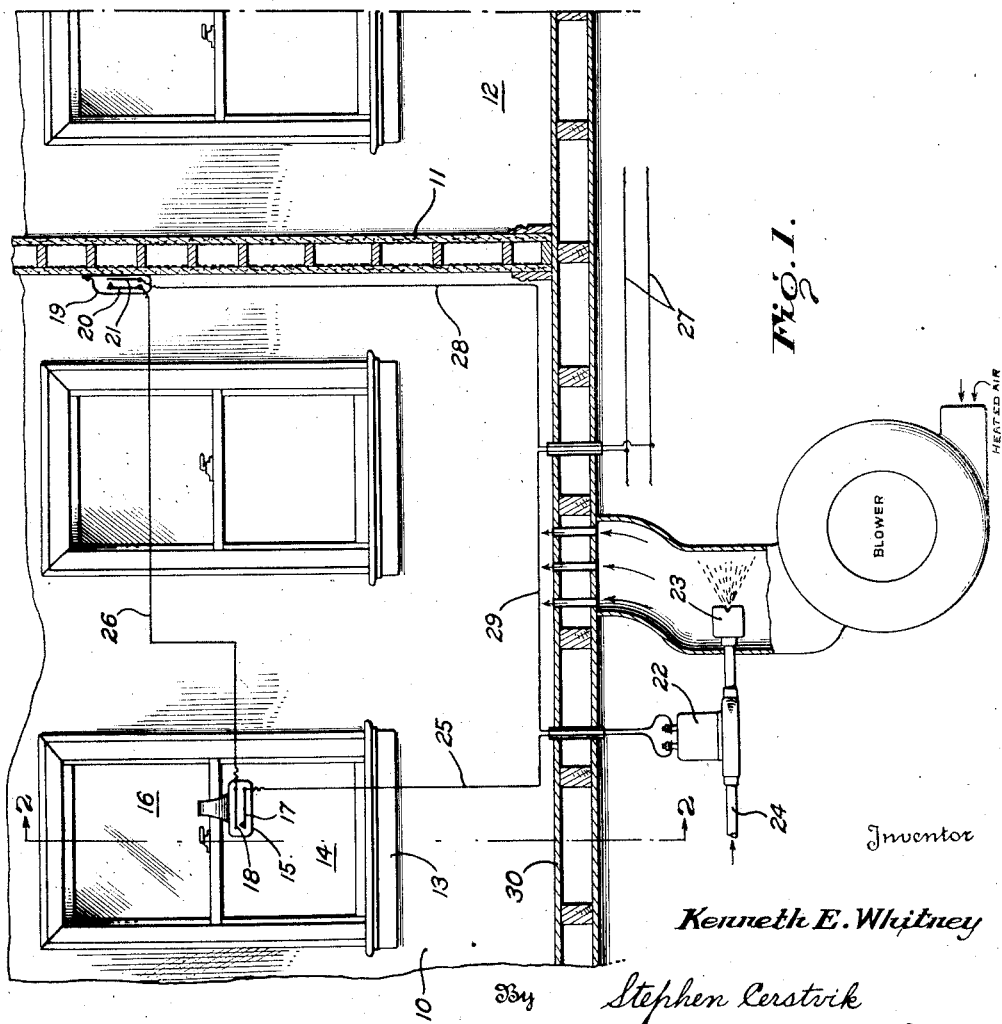

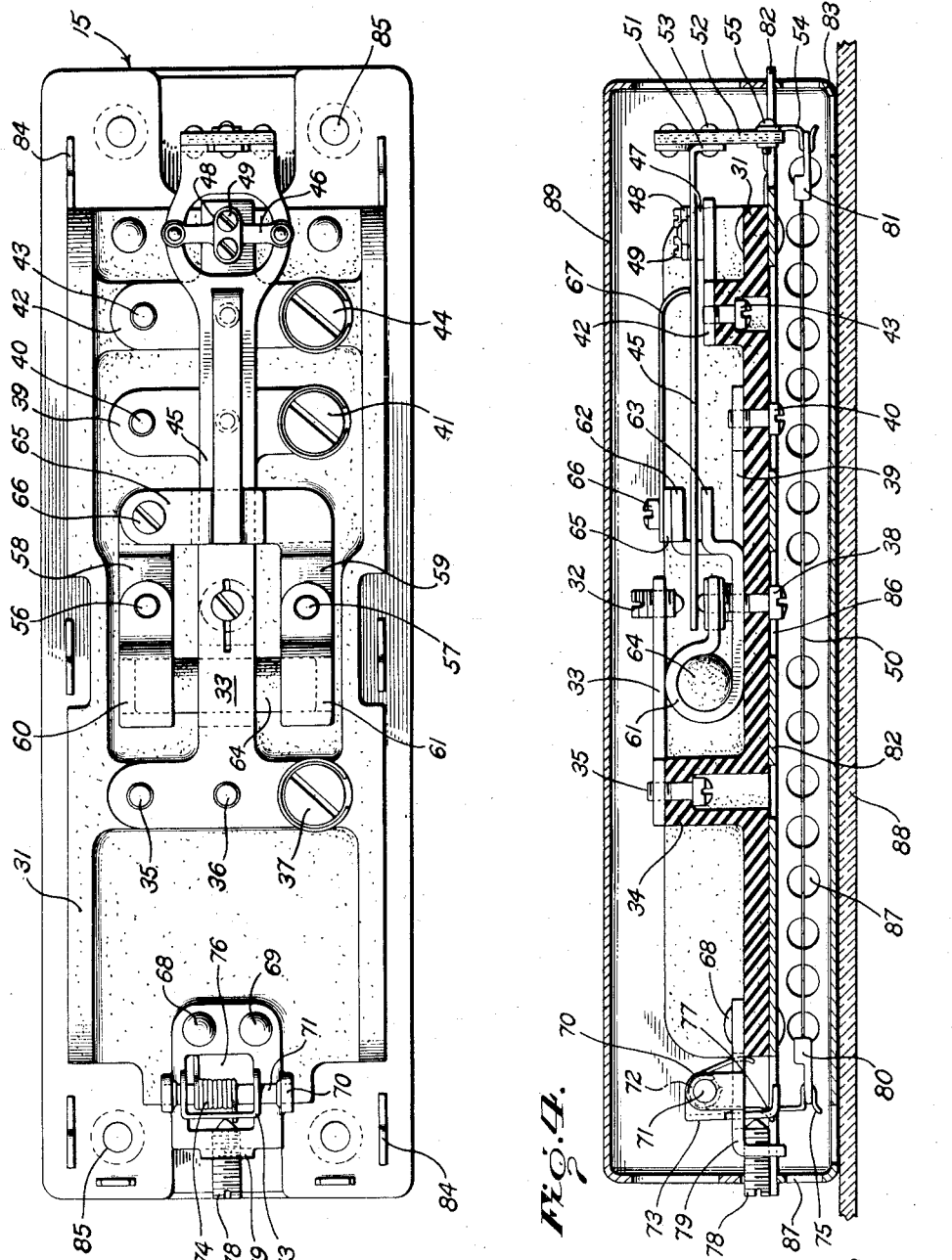

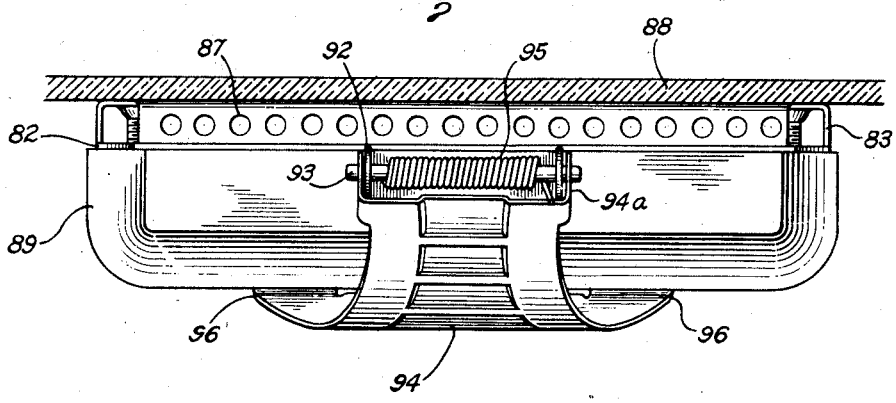
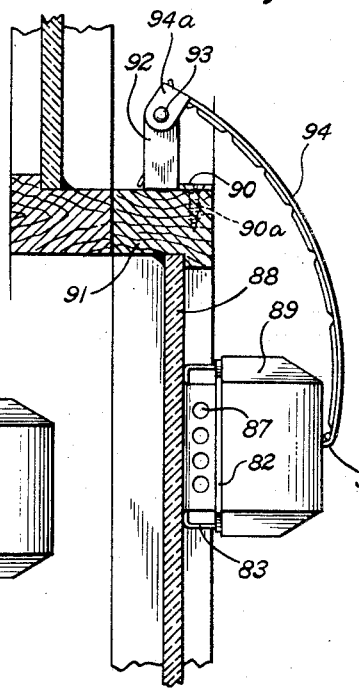
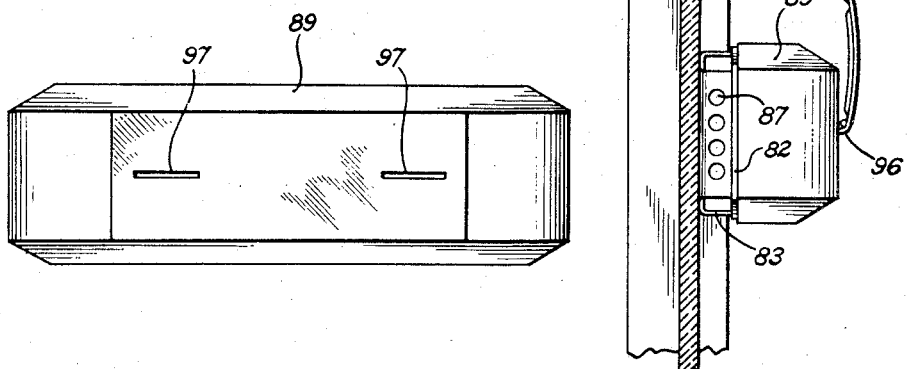

Patented Mar. 10, 1942

2,275,708

UNITED STATES PATENT OFFICE 2,275,708

HUMIDITY RESPONSIVE CONTROL DEVICE

Kenneth E. Whitney, Baltimore, Md., assignor to Bendix Aviation Corporation, South Bend, Ind., a corporation of Delaware Application December 3, 1937, Serial No. 177,992

1 Claim. (Cl. 200—52)

The present invention relates to a device responsive to a condition of the atmosphere at a chilled surface such as a window, and more particularly to a humidity responsive device arranged to respond to changes in the relative humidity prevailing at the chilled surface or window.

The device embodying the invention is particularly adapted for use either to control air circulating means, such as a fan or heater to prevent fogging of windows especially during cold weather, in the manner disclosed in my co-pending application Serial No. 122,499, filed January 26, 1937, or to control a humidifier for rendering the latter inoperative at desired times to prevent fogging of windows in the manner disclosed in the co-pending application of Ralph R. Chappell et al., Serial No. 39,858, filed September 9, 1935.

In previous devices of the prior art it has been possible to control the humidity only to about 60% of the humidity at a window, but with the novel device of the present invention, whereby the conditions at the window itself are more closely simulated, it is now possible to control to within 80% of the humidity at the window itself. In instruments having the precision of the instant device this is a definitely large increase in sensitivity.

One of the objects of the present invention, therefore, is to provide a novel device of the class described, including means whereby the device is subjected more intimately to the very conditions of the atmosphere prevailing at the chilled surface or window.

Another object is to provide a novel humidity responsive device for controlling the relative humidity at a chilled surface such as a window, including a hygroscopic element adapted to respond to changes in relative humidity, and heat conducting means intimately and substantially enclosing said element, whereby the latter is subjected to the temperature of the chilled surface or window itself and, therefore, can respond more closely to the relative humidity at the chilled surface, the humidity being higher nearer the chilled surface and highest at the chilled surface.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention, reference being had for this purpose to the appended claims.

Accordingly, in its broad aspects, the invention consists substantially in the construction, combination, location, form and relative arrangement of parts for obtaining the results desired in accordance with the foregoing objects, as will be more fully set forth in the specification, as shown in the drawings by way of example, and as finally pointed out in the claim.

In the drawings wherein like reference characters refer to like parts throughout the several views:

Fig. 1 is a partial view, in sectional elevation, of a room illustrating one manner in which the present invention may be utilized;

Fig. 2 is a sectional view taken on the line 2—2 of Fig. 1;

Fig. 3 is a detail plan view of one form of a device embodying the invention, the cover of the device being removed;

Fig. 4 is a side elevation, in section, of the device shown in Fig. 3 with the cover attached, and showing a section of the window pane with which the device is in contact;

Fig. 5 is a plan view of the device as mounted in position, illustrating the means for mounting the device against a condensation surface;

Fig. 6 is a side elevation of the device as shown in Fig. 5; and

Fig. 7 is a plan view of the cover per se illustrating the openings by means of which the mounting means are connected to the cover.

Referring to the drawings, and more particularly to Figs. 1 and 2, there is shown a humidifying control system of the type disclosed and claimed in the co-pending application of Ralph R. Chappell et al., Serial No. 39,858, with which the device of the present invention may be utilized.

The system shown comprises, in general, two humidostats or automatic humidity regulators, one of which may be of any known type, such, for example, as that disclosed in Patent No. 1,998,340, dated April 16, 1935, and the other of which is of the type embodying the present invention. The known type of humidostat is located in the normal position in the room in which the relative humidity is to be controlled, i. e., in a position where the relative humidity is average for a desired normal value, and the humidostat of the present invention is located in intimate proximity to or right against the chilled surface such as a window so that it can by its novel construction assume more closely, and, therefore, respond to, the humidity conditions prevailing at the chilled surface or window.

The two humidostats or controllers are connected to operate either electrically, pneumatically, hydraulically or in any other suitable manner in series relation, and are so set or adjusted for regulation that when the chilled surface to be protected from condensation or fogging is at temperatures not appreciably lower than the general room temperature, the humidostat located in the main body of the room controls the humidity conditions of the room to maintain the desired relative humidity, but should the surface to be protected from condensation or fogging become chilled later for any reason, as when the outdoor temperature drops, the humidostat of the present invention, which is located against the chilled surface or window takes control of the humidity regulation by virtue of the fact that this controller is rendered effective at a time earlier than the room humidostat due to the rise in relative humidity that takes place nearer the chilled surface or window. The humidostat which is located in the main body of the room will be hereinafter referred to as a "room" humidostat and the humidostat of the present invention, which is located against the chilled surface or window will be referred to as the "window" humidostat.

If, for example, it be desired to maintain a condition of comfort in a room or dwelling, the room humidostat might be set to control humidity conditions in the room to maintain the relative humidity therein substantially constant at 50%, i. e., it would be set to maintain the humidifier in operation until the relative humidity reached 50%, and thereupon it would render the humidifier inoperative. On the other hand, the "window" humidostat of the present invention would be set to control the humidifier at a higher relative humidity as, for example, at 80%, i. e., the "window" humidostat would tend to continue to operate the humidifier until the relative humidity at this humidostat and, hence, at the chilled surface or window, reached 80% and thereupon it would render the humidifier inoperative. Since, however, the two humidostats are connected in series, neither one can control the humidifier unless and until the other is in operating position, and then each is in operating position until the relative humidities at their respective locations reach the values for which the humidostats have been set and are immediately actuated to render the humidifier inoperative when each reaches its respective value for which it was set.

Thus, while the protected surfaces remain at temperatures substantially the same as room temperatures, as in the summer time when the outdoor temperature is substantially the same as the indoor temperature, the surfaces would not be chilled, and, hence, the relative humidity in intimate proximity to the protected surface would remain substantially the same as the average relative humidity in the room. Therefore, since the window humidostat is set for a point of control higher than the average desired relative humidity it would remain in an operative position and its connection with the room humidostat would remain completed so that the room humidostat could perform its function of maintaining the relative humidity constant at 50%. In other words, as long as the temperature of the protected surfaces is the same as the room temperature, the relative humidity at or near the surfaces will be at or near the same relative humidity as in the room and, hence, the window humidostat will always remain in an operating position because it cannot be actuated into an inoperative position unless the relative humidity in its vicinity reaches the higher relative humidity for which said window humidostat has been set, but under these conditions the higher humidity does not occur because the room humidostat maintains the average relative humidity at 50%.

As the temperature of the protected surfaces begins to fall, an increase in the relative humidity of the air near the protected surfaces takes place. Some increase in relative humidity in intimate proximity to the protected surface is ordinarily permissible and in fact, protection is not required until the chilling of the protected surface is sufficient to so chill the air adjacent thereto as to cause the percentage of relative humidity on the actual surface to rise to 100% and thus, cause condensation, fogging or sweating.

The devices may be so adjusted, that as soon as the outdoor temperature drops to such an extent as to so chill the surfaces and cause the relative humidity at or adjacent to the surface to increase to approximately 80%, the window humidostat will be immediately actuated into open-circuit position, thereby breaking its series connection with the room humidostat and rendering the humidifier inoperative, thus cutting down the supply of moisture to the room and, hence, preventing condensation from taking place on the chilled surface.

Referring now to the drawings and more particularly to Fig. 1, there is shown a corner of a room formed by an outside wall 10 and an inside wall 11 which separates said room from an adjoining room 12. The outside wall 10 is provided with windows 13 and 14. Since the wall 10 is an outside wall, it is much colder than the inside wall 11 when the outdoor temperatures are below normal, as in the winter time. Hence, as previously explained, the wall 10 and the windows 13 and 14 would sweat, i. e., have condensation formed upon them even though the relative humidity in the room would be approximately 50%. In order to prevent such sweating, a novel humidostat 15 embodying the present invention is secured to the window 13 in close proximity to or right against a window pane 16. This humidostat 15 constitutes the window humidostat and is set for a relative humidity of approximately 80% and is of the electrical type having a set of contacts which are diagrammatically illustrated as contacts 17 and 18, these contacts remaining closed until the relative humidity reaches the value for which the humidostat has been set. It is to be expressly understood, however, that either two wire or three wire control may be utilized, the two wire control being shown merely to simplify the drawings. Another humidostat 19 is secured to the wall 11 and at a distance $x$ (Fig. 2) from the outside wall 10, the distance $x$ being greater than the maximum distance at which the relative humidity begins to increase as the wall 10 or windows 13 and 14 are approached. The distance $x$ may be determined from graphs obtained by operating the device under actual normal conditions. The humidostat 19 is of the ordinary type and is provided with relatively movable electrical contacts 20 and 21 but is set for a relative humidity of approximately 50% or such humidity as it is desired to maintain in the room for comfort or other reasons. Contacts 20 and 21 will, therefore, remain closed until the average relative humidity in the room reaches 50%.

In accordance with one manner of utilizing the device of the present invention, the humidostats 15 and 19, in the present embodiment, are connected in a series electrical circuit which includes a humidifier constituted by a solenoid valve shown generally at 22, said valve controlling the supply of water supplied to a spraying device 23 from a supply pipe 24. Accordingly, one terminal of the humidostat 15 is connected to one terminal of the solenoid valve 22 by means of a lead 25 and the other terminal of the humidostat 15 is connected to one terminal of the humidostat 19 by means of the lead 26. The other terminal of the humidostat 19 is connected to one side of an electrical supply line 27 by means of a lead 28 while the other side of the supply line is connected to the other terminal of the solenoid valve 22 by means of a lead 29. Thus, when contacts 17, 18 and contacts 20, 21 are all closed, the circuit is completed and the solenoid valve 22 is operated to permit the passage of water from pipe 24 to the spraying device 23. If, however, either the contacts 17, 18 or the contacts 20, 21 are opened, the solenoid valve 22 is closed and no water is supplied to the spraying device 23 from the supply pipe 24.

The humidifier, i. e., the spraying device 23 is preferably located in the basement for supplying water to the main air-conditioning equipment and is, therefore, shown as being below the floor 30 of the room. However, the humidifier may be part of a cabinet type air-conditioner which may be located in the room, without departing from the scope of the invention for the reason that the invention is primarily in the particular window humidostat by which the humidifier is controlled and not in the other elements of the system.

Thus, it will be seen that as long as the outdoor temperature is substantially the same as the temperature inside the room, the wall 10 and windows 13 and 14 will not become chilled and, hence, the wall and windows will not sweat because under such conditions the relative humidity is the same at or on the wall 10 as the average humidity of the room. Consequently, the contacts 17, 18 of the humidostat 15 will always remain closed as humidostat 15 is set for a high humidity and only the contacts 20, 21 of humidostat 19 will control the operation of the humidifier to maintain the relative humidity in the room at the value for which said humidostat 19 has been set, i. e., approximately 50% if the room be that of a dwelling. For industrial purposes, as in the manufacture of textiles or in the treatment of tobacco when the enclosure would be a room in which a relative humidity other than that required for health or comfort conditions is desired to be maintained, the humidostat 19 would be set for this other relative humidity and the humidostat 15 would then be located on a surface which is exposed from the outside to chilling temperatures and would be set for a higher relative humidity than the humidostat 19 in order to prevent condensation on the chilling surface.

By suitable setting of the room humidostat 19 and the window humidostat 15, the desirable relative humidity can be maintained in the room until chilling of the wall 10 and windows 13 and 14 would cause danger of condensation. Before such condensation could take place, however, the window humidostat would take control away from the room humidostat and would thereafter maintain the highest possible humidity without condensation occurring no matter how much the temperature of the wall and windows might drop. In this manner and without manual control or human attention of any kind, the humidity is maintained in the room generally at the highest practical point.

The novel device of the present invention comprises a humidity control device so constructed and arranged as to enable its being placed into intimate contact with or in close proximity to the surface upon which condensation is to be prevented and to closely simulate the conditions at said surface.

As shown in Figs. 3 and 4, one embodiment of the present invention comprises a humidostat generally designated as 15 having a base 31 of electrical insulating material on which is mounted an adjustable contact 32 by means of contact arm 33 held in place in boss 34 by screws 35 and 36 and carrying the binding post 37. Opposite to the contact 32 is an adjustable contact 38 mounted on base 31 by arm 39 held in place by screw 40 and carrying binding post 41. Contact arm 42 mounted on base 31 by screw 43 and carrying binding post 44 has mounted thereon for reciprocation in a vertical plane between contacts 32 and 38, a movable contact closing arm or armature 45 composed of magnetic material, balanced on a pivot formed by spring arm 46 fastened to contact arm 42 between clamps 47 and 48 held together by screws 49. The end of arm 45 opposite to the contacting end thereof is connected to the humidity responsive device 50 by means of end 51 of arm 45 bent at right angles thereto and fastened to insulating block 52 by rivets 53, said block carrying the wire hook 54 fastened to block 52 by eyelet 55, said hook being fastened to the humidity responsive element 50 as set out in detail later.

Mounted on base 31 by means of screws 56 and 57 are the brackets 58 and 59, respectively. Each bracket 58 and 59 is composed of a magnetizable material with eyes 60, 61, respectively, formed on one end and pole pieces 62, 63, respectively, formed on the opposite end. Magnet 64 is held in place by the eyes 60 and 61 which are securely clamped to the magnet by screws 56 and 57. By means of magnet 64, pole piece 62 becomes one pole of a magnet the opposite pole of which is comprised by pole piece 63. By means of the suspension of armature 45 with its free end between pole pieces 62 and 63 a quick, snap action is obtained upon actuation of armature 45 either upwardly or downwardly (as viewed in Fig. 4) by the humidity responsive device 50.

Mounted just above pole piece 62 by means of metallic piece 65 held in place by screw 66 and brazed thereto at one end thereof is a spring 67 whose opposite end bears firmly against armature 45.

Also mounted on base 31 at one end thereof, by means of rivets 68, is a metallic base 69 carrying lugs 70 between which is mounted rod 71 passing through openings 72 in the lugs 70 and openings in element 73 which is rotatably mounted on rod 71 by means of said openings and which is resiliently urged in a clockwise direction by spiral spring 74 having one end thereof bearing against piece 73 and extending beyond the end thereof to form the hook connection 75 and the other end locked against the inner edge of opening 76 through which piece 73 extends. A slot 77 provides a guide for hook connection 75 to maintain it aligned in proper position. Screw 78 threaded in lug 79 of metallic base 69 abuts against piece 73 and serves as adjustment means whereby the operating point of the contacts may be varied.

Suspended between hook connection 75 and hook 54 is a humidity responsive element which in the present embodiment is illustrated as composed of a series of parallel human hairs mounted at their ends in clamps 80, 81 connected to hooks 75 and 54, respectively, but any form of humidity responsive element may be provided.

The novel means of the present invention comprises a metal shield composed of two parts 82, 83 of high heat conductivity, such as brass, and mechanically connected together by spinning or peening as at 84 (see Fig. 3) and fastened to base 31 by means of screws 85. Openings 86 are provided in the plate part 82 in order to electrically insulate the metal shield from the electrical parts of the humidostat. Part 83 is formed into a channel having a series of openings 87 therein leading to the space wherein is mounted the humidity responsive element 50.

The channel part 83 of the shield is held in direct contact with the surface upon which condensation is to be controlled by means which will be described in detail later, said surface in the present embodiment being illustrated as a glass window 88. By means of the shield 82, 83, which intimately and substantially encloses the humidity responsive element 50, the temperature of the condensation surface 88 is directly conducted to the immediate proximity of the humidity responsive element 50 whereby the element closely simulates the actual temperature condition of the surface and simulates actual contact of the element 50 with the window. The heat conducting element thereby provides in combination with the humidity responsive device, a control of greater sensitivity and one which when utilized in a system as disclosed enables the humidity to be controlled within much closer tolerances than heretofore as the instrument can be set closer to the actual dew point of the window itself.

With the humidostat removed some distance from the window upon changes in the outside temperature the actual humidity at the humidostat will vary through too wide a range, thereby either permitting sweating or requiring a resetting of the hair element. By placing the hair elements against the window the changes in humidity at the hair element, with changes in outside temperature is so greatly reduced that the hair element does not have to be reset. By the use of the present novel device the operation of the hair element in contact with the window is closely simulated.

A cover 89, removably fastened to the humidostat proper, completely encloses that part of the operative mechanism above the base 31.

In Figs. 5, 6 and 7 are illustrated the means whereby the humidostat may be mounted in position against the window, as shown diagrammatically in Fig. 1.

As seen in Fig. 6, a bracket 90 is mounted by any suitable means such as screws 90a on the sash of the window frame 91 holding the window 88. Lugs 92 on bracket 90 support a rod 93 on which is mounted arm 94 by means of lugs 94a which is resiliently urged in a clockwise direction by spiral spring 95 (see Fig. 5). The ends 96 of arm 94 enter openings 97 in cover 89 and thereby support the humidostat in position against the window, the spring 95 being of sufficient strength to maintain the humidostat firmly in position against window 88 to thereby ensure the proper conduction of the temperature of the window to the channel 83 and thus to the humidity responsive element 50.

The operation of the device is as follows:

The humidostat is held in position against the window with the heat conducting plate 82 and channel 83 intimately surrounding the humidity responsive means 50 and with channel 83 in direct contact with the window or other chilled surface on which condensation tends to take place. The temperature of the window is thereby transmitted to the humidity responsive device, and the air entering the openings 87 is thereby maintained at a temperature which closely approaches that of the window or other chilled surface, thereby reproducing at the humidity responsive element the actual conditions at the window. Upon a change in the relative humidity, the humidity responsive element actuates the armature 45 by means of hook 54 and insulating piece 52 to move the armature into closer proximity with one of the contacts 32, 38 whereupon one of the magnetic poles 62, 63 snaps the armature into contact whereby the proper circuit is actuated to control the device for controlling the condensation on the surface 88. The heat conducting means transmit the temperature of the window to the immediate proximity of the humidity responsive element and thereby increase the sensitivity thereof making possible a closer control of the humidity and, hence, of the condensation.

Means are thus provided whereby a highly sensitive humidostat is provided that clearly simulates the conditions at a surface such as a window or other surface on which condensation tends to take place, and means are further provided for mounting said humidostat in an effective manner against such a surface or window.

Although only one embodiment of the invention has been illustrated and described, further changes and modifications in form, material and relative arrangement of parts, which will now appear to those skilled in the art, may be made without departing from the scope of the invention. Reference is, therefore, to be had to the appended claim for a definition of the limits of the invention.

What is claimed is:

A humidostat comprising a base composed of electrical insulating material, adjustable electrical contacts mounted on said base, oscillating means torsionally pivoted for movement between said contacts, force exerting means for holding said oscillating means in one or the other of its extreme oscillatory positions upon movement of said means from its intermediate mean position, humidity responsive means comprising an element connected to said oscillating means at one end and adjustably mounted at the other end, heat conducting means comprising a metal shield having a perforated channel portion and a plate member, said channel portion and plate member substantially surrounding said humidity responsive means, whereby said humidity responsive means directly simulate the temperature at a desired location from which the heat is conducted by said heat conducting means, and means for pivotally mounting said humidostat against a surface, said mounting means comprising a relatively stationary fastening bracket having a pivoted arm projecting therefrom and attached to said humidostat for holding the latter in operative position against said surface, whereby said humidostat may be moved toward and away from said surface without disturbing the relatively stationary bracket.

KENNETH E. WHITNEY.